US009794134B2

(12) United States Patent
Rostaing et al.

(10) Patent No.: US 9,794,134 B2
(45) Date of Patent: Oct. 17, 2017

(54) SYSTEM AND METHOD FOR NEGOTIATING CONTROL OF A SHARED AUDIO OR VISUAL RESOURCE

(71) Applicant: Apple Inc., Cupertino, CA (US)

(72) Inventors: Andrew E. Rostaing, San Francisco, CA (US); Eric S. Lee, Mountain View, CA (US); Gregory R. Chapman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 811 days.

(21) Appl. No.: 13/888,232

(22) Filed: May 6, 2013

(65) Prior Publication Data
US 2014/0143424 A1    May 22, 2014

Related U.S. Application Data

(60) Provisional application No. 61/727,554, filed on Nov. 16, 2012.

(51) Int. Cl.
*G06F 9/52* (2006.01)
*H04L 12/24* (2006.01)

(52) U.S. Cl.
CPC .............. *H04L 41/24* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 2002/0152267 A1* | 10/2002 | Lennon ......................... | 709/203 |
| 2004/0045030 A1* | 3/2004 | Reynolds et al. ............ | 725/110 |
| 2004/0090121 A1* | 5/2004 | Simonds et al. ............. | 307/10.1 |
| 2006/0235864 A1* | 10/2006 | Hotelling et al. ............ | 707/101 |
| 2006/0258289 A1* | 11/2006 | Dua .................. | G06F 17/30058 455/41.3 |
| 2007/0150886 A1* | 6/2007 | Shapiro ........................ | 717/174 |
| 2009/0049119 A1* | 2/2009 | Marcinkiewicz ....... | H04L 67/28 709/203 |

(Continued)

OTHER PUBLICATIONS

International Preliminary Report on Patentability and Written Opinion from PCT/US2013/070123, Dated May 28, 2015, Apple Inc., pp. 1-7.

(Continued)

*Primary Examiner* — Henry Tsai
*Assistant Examiner* — Christopher Bartels
(74) *Attorney, Agent, or Firm* — Robert C. Kowert; Meyertons, Hood, Kivlin, Kowert & Goetzel, P.C.

(57) ABSTRACT

Systems and methods for negotiating control of a shared audio or visual resource are disclosed. A request for control of a shared audio or visual resource is received at an arbiter. The arbiter maintains existing state information for ownership of the shared audio or visual resource and ownership transition conditions of the shared audio or visual resource. The request is received from one of a process executing on an embedded system and a process executing on a mobile computing device. New state information regarding ownership of the shared audio or visual resource is determined based at least in part on the request for control and the ownership transition conditions. The new state information indicates which of the processes controls output of the shared audio or visual resource.

26 Claims, 10 Drawing Sheets

(56) References Cited

U.S. PATENT DOCUMENTS

| | | | | |
|---|---|---|---|---|
| 2009/0069972 | A1* | 3/2009 | Templeton et al. | 701/29 |
| 2009/0254971 | A1 | 10/2009 | Herz et al. | |
| 2009/0315766 | A1 | 12/2009 | Khosravy et al. | |
| 2010/0106345 | A1* | 4/2010 | Hwang | G07C 5/0816 701/2 |
| 2011/0069179 | A1* | 3/2011 | Bathiche | H04N 5/23206 348/207.1 |
| 2011/0106954 | A1* | 5/2011 | Chatterjee et al. | 709/227 |
| 2011/0314168 | A1* | 12/2011 | Bathiche et al. | 709/228 |
| 2013/0273847 | A1* | 10/2013 | Le | H04L 12/1895 455/41.2 |
| 2014/0170602 | A1* | 6/2014 | Reed | G09B 19/167 434/62 |

OTHER PUBLICATIONS

Toyota Motor Corporation: "Toyota Prius 2006 Model Driver's Manual", 2005, pp. 171-236, Corporation, United States.
International Search Report and Written Opinion from PCT/US2013/070123, mailed Feb. 13, 2014, Apple Inc., pp. 1-11.
Office Action from Korean Application No. 10-2015-7014215, Dated Oct. 27, 2016 (English Translation and Korean Version), Apple Inc., pp. 1-10.
Toyota Motor, "2006 Toyota Prius Owner's Manual", 2006, pp. 1-448.

\* cited by examiner

```
┌─────────────────────────────────────────────────────────────────────────────┐
│ Receive at an arbiter a request for control of a shared audio or visual resource of the vehicle, where │
│ the request is received from a process executing on an embedded system attached to the vehicle or │
│ a process executing on a mobile computing device temporarily communicating with the vehicle and │
│ the arbiter maintains existing state information for ownership of the shared audio or visual resource │
│ and ownership transition conditions of the shared audio or visual resource │
│                                         505                                 │
└─────────────────────────────────────────────────────────────────────────────┘
                                          │
                                          ▼
┌─────────────────────────────────────────────────────────────────────────────┐
│ Determine new state information regarding ownership of the shared audio or visual resource based │
│ at least in part on the request for control and the ownership and transition conditions such that the │
│ new state information indicates which of the processes controls the output of the shared audiovisual │
│                                      resource                               │
│                                         515                                 │
└─────────────────────────────────────────────────────────────────────────────┘
                                          │
                                          ▼
┌─────────────────────────────────────────────────────────────────────────────┐
│ Determine new ownership transition conditions of the shared audio or visual resource │
│                                         525                                 │
└─────────────────────────────────────────────────────────────────────────────┘
                                          │
                                          ▼
┌─────────────────────────────────────────────────────────────────────────────┐
│ Communicate to a controller interface of the shared audio or visual resource the new state │
│                                    information                              │
│                                         535                                 │
└─────────────────────────────────────────────────────────────────────────────┘
```

FIG. 5B

SYSTEM AND METHOD FOR NEGOTIATING CONTROL OF A SHARED AUDIO OR VISUAL RESOURCE

PRIORITY

This application claims benefit of priority of U.S. Provisional Application Ser. No. 61/727,554 entitled "System and Method for Negotiating Control of a Shared Audio or Visual Resource" filed Nov. 16, 2012, the content of which is incorporated by reference herein in its entirety.

BACKGROUND

Technical Field

This disclosure relates generally to shared use of audio or visual resources, and, more specifically, to negotiating control of shared audio or visual resources.

Description of the Related Art

Vehicular audio or visual systems and mobile computing devices (also called multifunction devices) frequently need to transition control of audio or visual resources shared by processes executing on the multifunction devices and processes executing on the vehicle. For example, a user may desire transition between music being played on multifunction device, such as a phone or tablet computer, and navigation instructions or vehicle condition information being provided by the car itself through various processes executing on embedded systems of the car.

With the advent of increasingly networked devices in other environments, desire for shared control of audio and visual resources likewise exists in other contexts, and current tools for, for example, arbitrating control of a television screen in a home entertainment system are complex, clumsy, and frustrating.

Current technology requires crude manual interventions by the user to establish control of output devices such as speakers (e.g., plugging a device into an input jack and pressing a button on the stereo to shift audio from a stereo to a phone). With the proliferation of devices available to users, the increase in services provided by those multifunction devices (e.g., music, video, phone personal assistant, navigation), the increase in services provided by embedded systems (e.g., vehicle telemetry and control, navigation, phone, various configurations of radio, safety information), the need for less error prone and more efficient replacements pressing buttons on the face of a stereo is steadily becoming more urgent.

SUMMARY OF EMBODIMENTS

Systems and methods for negotiating control of a shared audio or visual resource are disclosed. A request for control of a shared audio or visual resource is received at an arbiter. The arbiter maintains existing state information for ownership of the shared audio or visual resource and ownership transition conditions of the shared audio or visual resource. New state information regarding ownership of the shared audio or visual resource is determined based at least in part on the request for control and the ownership transition conditions. The new state information indicates which of the processes controls output of the shared audio or visual resource. New ownership transition conditions of the shared audio or visual resource are determined and communicated to a controller interface of the shared audio or visual resource.

BRIEF DESCRIPTION OF THE DRAWINGS

FIG. 5B is a flow diagram illustrating one embodiment of a method for negotiating control of a shared audio or visual resource of an automobile.

Figure 1:
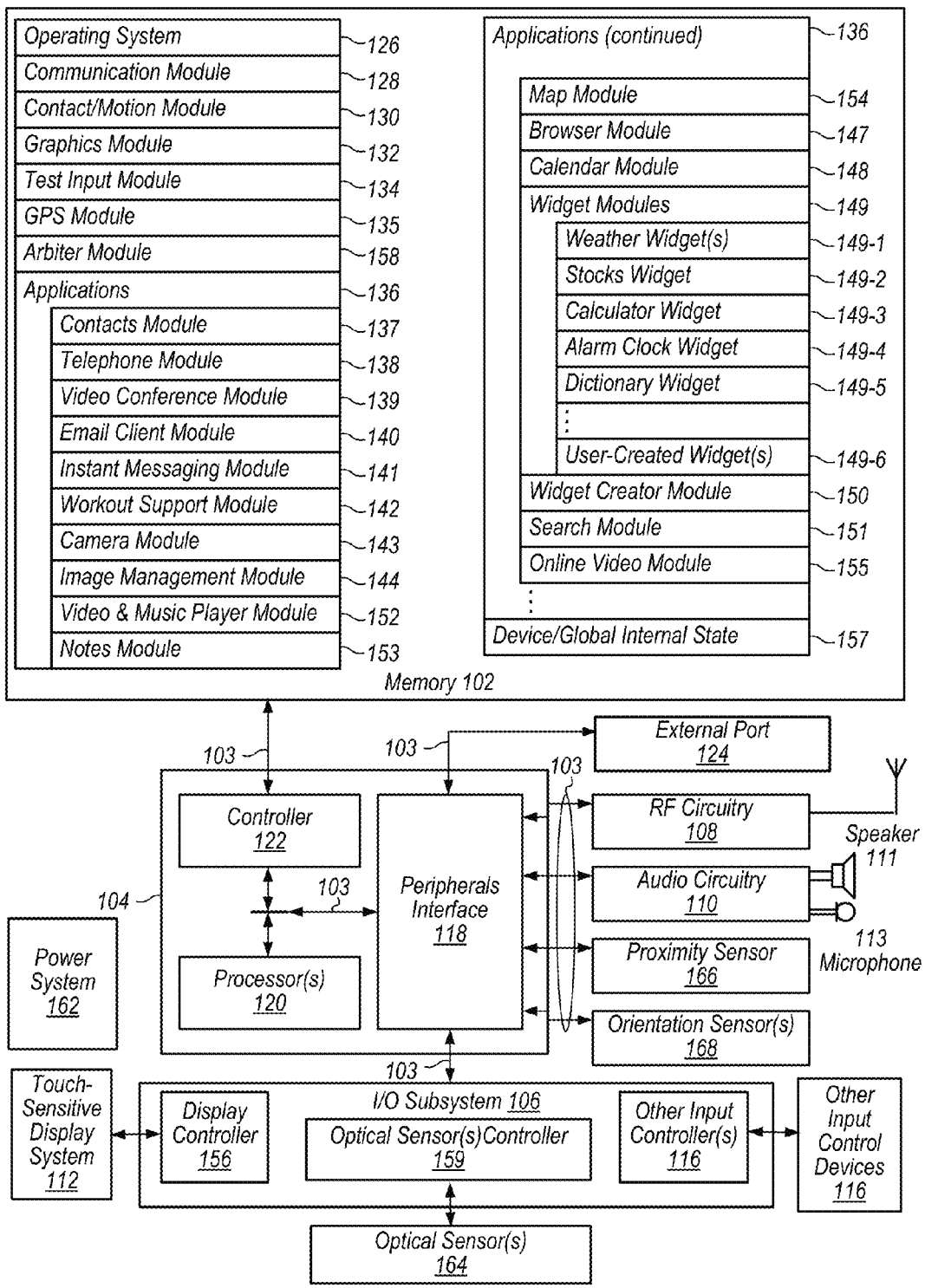
FIG. 1 illustrates a block diagram of a portable multifunction device in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a system and method for negotiating control of a shared audio or visual resource of an automobile are disclosed. In some embodiments, the negotiating tools, sharing applications, and/or arbiter applications described herein may be implemented as part of various multifunction devices, including but not limited to mobile phones that have GPS functionality, tablet computing devices, and/or personal navigation devices. A user of such a multifunction device may interact with a applications capable of generating output for various audio and/or visual systems of the automobile, and the negotiating tools, sharing applications, and/or arbiter applications described herein may determine control of the shared audio or visual resource of an automobile to allow output of the applications to be routed to the various audio and/or visual systems of the automobile. In some embodiments, the negotiating tools, sharing applications, and/or arbiter applications described herein may be implemented as part of various systems of a vehicle, such as the computers operating on an automobile, boat or airplane.

A method for negotiating control of a shared audio or visual resource of an automobile is provided. In some embodiments a request for control of a shared audio or visual resource of the vehicle is received at an arbiter. The arbiter maintains existing state information for ownership of the shared audio or visual resource and ownership transition conditions of the shared audio or visual resource. The request for control of the shared audio or visual resource of the vehicle is received from one of a plurality of processes comprising a process executing on an embedded system attached to the vehicle and a process executing on a mobile computing device temporarily communicating with the vehicle. New state information regarding ownership of the shared audio or visual resource is determined. Determining the new state information includes determining the new state information based at least in part on the request for control and the ownership transition conditions. The new state information indicates which of the processes controls output of the shared audio or visual resource of the vehicle. New ownership transition conditions of the shared audio or visual resource are determined and communicated to a controller interface.

In some embodiments, the determining new state information regarding ownership of the shared audio or visual resource further includes determining new state information regarding ownership of the shared audio or visual resource without regard to whether the request for control of the shared audio or visual resource of the vehicle originated from the process executing on an embedded system attached to the vehicle or a process executing on a mobile computing device temporarily communicating with the vehicle. In some embodiments, the arbiter is a process executing on the mobile computing device or multifunction device. In some embodiments, the arbiter is a process executing on hardware hosting the shared audio or visual resource. In some embodiments, the arbiter is a process executing on a connection system (e.g., circuits in cabling, routers, hubs, or interconnects). Some embodiments further support receiving at the arbiter a request for control of another shared audio or visual resource of the vehicle and determining new state information regarding ownership of the another shared audio or visual resource of the vehicle based on the request for control of the another of the shared audio or visual resource of the vehicle. In some such embodiments, the new state information regarding ownership of the another shared audio or visual resource of the vehicle indicates which of the processes controls output of the another shared audio or visual resource of the vehicle, and the new state information regarding ownership of the another shared audio or visual resource of the vehicle is determined independent of the new state information regarding ownership of the shared audio or visual resource.

In some embodiments, the one of the shared audio or visual resource of the vehicle is a video display, and the another of the shared audio or visual resource of the vehicle is an audio channel. In some embodiments, the one of the shared audio or visual resource of the vehicle is an output channel, and the another of the shared audio or visual resource of the vehicle is an input/output channel.

In some embodiments, the determining new state information regarding ownership of the shared audio or visual resource further includes determining new state information regarding ownership of the shared audio or visual resource such that a first one of the processes owns control of the one of the shared audio or visual resource of the vehicle, and a second one of the processes is designated to control output of the one of the shared audio or visual resource for the duration of a task and returns control of the one of the shared audio or visual resource of the vehicle to control output of the one of the shared audio or visual resource after completion of the task. Some embodiments further support configuring a control channel for communicating between the shared audio or visual resource, the arbiter, and the mobile computing device, wherein the arbiter is a process executing on the embedded system attached to the vehicle.

Some embodiments may include a means for negotiating control of a shared audio or visual resource of an automobile. For example, an arbiter or an arbiter module may receive a request for control of a shared audio or visual resource of the vehicle, determine new state information regarding ownership of the shared audio or visual resource, determine new ownership transition conditions of the shared audio or visual resource and communicate the new state information regarding ownership of the shared audio or visual resource, as described herein. The arbiter module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to receive a request for control of a shared audio or visual resource of the vehicle, determine new state information regarding ownership of the shared audio or visual resource, determine new ownership transition conditions of the shared audio or visual resource and communicate the new state information regarding ownership of the shared audio or visual resource, as described herein. Other embodiments of an arbiter module may be at least partially implemented by hardware circuitry and/or firmware stored, for example, in a non-volatile memory.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices. FIG. 1 is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1 shows an optical sensor coupled to optical sensor controller 159 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 158 and applications (or sets of instructions) 136. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; state information that indicates which processes control output of shared audio or visual resource of a vehicle; ownership transition conditions of the shared audio or visual resource; and location information concerning the device's location and/or attitude.

Operating system 126 (e.g., Darwin, LINUX, UNIX, OS X, WINDOWS, or an embedded operating system such as VxWorks or RTXC) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video module and a music module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, and communication module 128, arbiter module 158 negotiates control of a shared audio or visual resource of an automobile. A request for control of a shared audio or visual resource of the vehicle is received at arbiter module 158. Arbiter module 158 maintains existing state information for ownership of the shared audio or visual resource and ownership transition conditions of the shared audio or visual resource. The request for control of the shared audio or visual resource of the vehicle is received from one of a plurality of processes including a process executing on an embedded system attached to the vehicle and a process executing on a mobile computing device (portable multifunction device 100) temporarily communicating with the vehicle. New state information regarding ownership of the shared audio or visual resource is determined by arbiter module 158 based at least in part on the request for control and the ownership transition conditions. The new state information indicates which of the processes controls output of the shared audio or visual resource of the vehicle. New ownership transition conditions of the shared audio or visual resource are determined by arbiter module 158 and communicated to a controller interface of the shared audio or visual resource.

In conjunction with RF circuitry 108, audio circuitry 110, speaker 111, microphone 113, touch screen 112, display controller 156, optical sensor 164, arbiter module 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 159, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Figure 2:
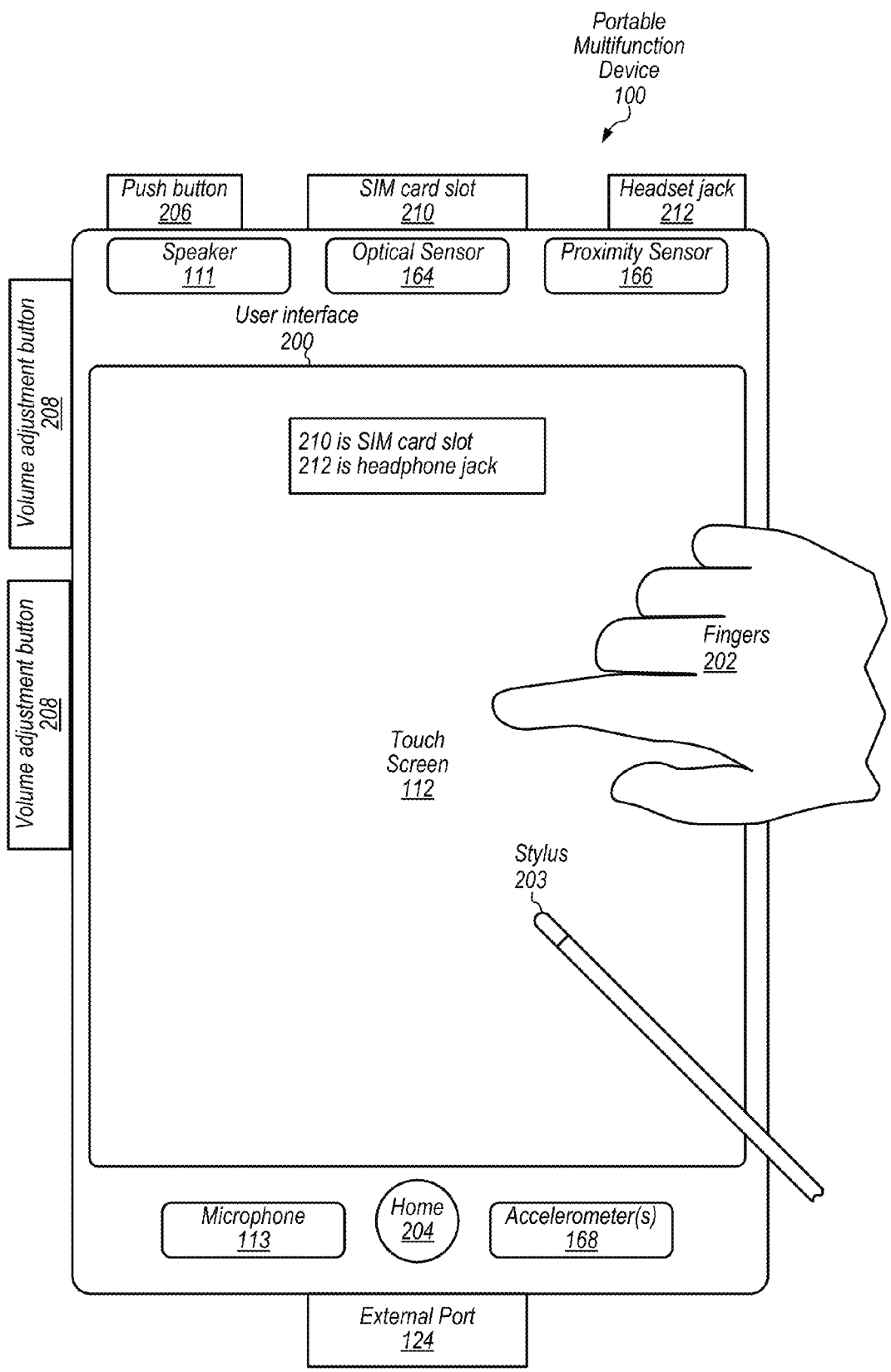
FIG. 2 illustrates a portable multifunction device in accordance with some embodiments.

FIG. 2 illustrates a portable multifunction device 100 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, device 100 also may accept verbal input for activation or deactivation of some functions through microphone 113.

Automotive Integration

Figure 3A:
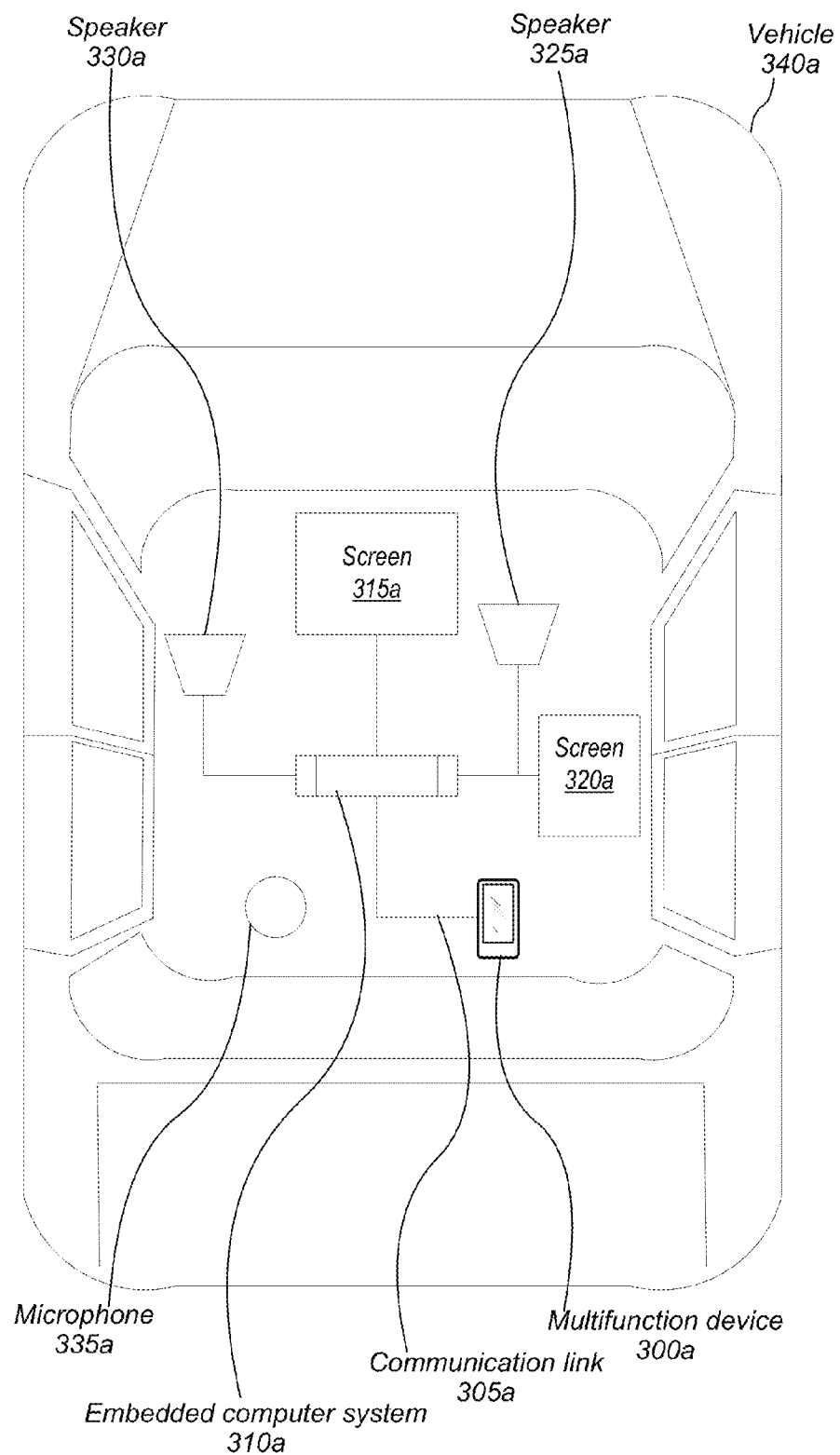
FIG. 3A illustrates a multifunction device interacting with audio and visual resources of a vehicle in accordance with some embodiments.

FIG. 3A illustrates a multifunction device interacting with audio and visual resources of a vehicle in accordance with some embodiments. A multifunction device 300a communicates over a communication link 305a (connected e.g., via RF circuitry 108 of FIG. 1 or a wire to external port 124 of FIG. 2) with an embedded computer system 310a of the vehicle 340a. The embedded system may be a general or special purpose computing device with processing and memory features similar to those discussed below with respect to FIG. 6. Embedded system is attached to display screens 315a and 320a as well as speakers 325a and 330a. A microphone 335a is likewise attached to embedded computer system 310a.

Some embodiments provide a mechanism for the vehicle 340a and multifunction device 300a to negotiate ownership and use of shared resources and communicate application ownership state information to avoid conflict that would lead to a bad user experience. Examples of shared resources include display screens 315a and 320a. Display screen 315a may be referred to as a head unit screen the head unit screen. Other examples of shared resources include a duplex (input and output) audio stream carried over speakers 320a and 325a, as well as microphone 335a. In some embodiments, it is preferable that an implementation be provided such that there can be only one source (either vehicle 340a or multifunction device 30a0) for main audio carried over speakers 320a and 325a, as well as microphone 335a. Voice control, personal assistant communications (e.g., Siri™ by Apple), telephony, and media are examples of audio that may be delivered by main audio carried over speakers 320a and 325a, as well as microphone 335a. While embodiments are described with respect to an arbiter executing on a multifunction device 300a, one of skill in the art will readily comprehend in light of having read the attached disclosure that the disclosure is not so limited, and that embodiments of the arbiters described herein may also execute on other devices, such as embedded computer system 310a or may control embedded systems of devices other than automobiles, such as home security systems, entertainment systems or appliances. In some embodiments, a shared resource is a motor or actuator or feature other than an audio or visual resource.

Additionally, some embodiments support an alternate output-only audio stream carried over speakers 320a and 325a. In some embodiments, there can be multiple sources of alternate audio, which are mixed together (possibly with ducking). User interface sounds, alerts, and navigation prompts are examples of audio that would go over this stream. In some embodiments, both vehicle 340a and multifunction device 300a distinguish between main and alternate audio, and route audio accordingly.

Embodiments support negotiating control of a shared audio or visual resource of a vehicle for application-specific states. Examples of application-specific states may, in some embodiments, be communicated between the vehicle 340 and the multifunction device 300a include speech, phone call, and turn-by-turn navigation. In a speech application-specific state, when either vehicle 340a or multifunction device 300a is recording audio for the purposes of speech recognition, some embodiments are configured such that all audio output over speakers 320a and 325a is disabled to prevent interference with speech recognition algorithms operating over sound captured over microphone 335a. Likewise, in some embodiments, when either the vehicle 340a or multifunction device 300a is speaking to the user, the other of vehicle 340a or multifunction device 300a avoids playing speech. For example, in some embodiments, navigation prompts are replaced with tones delivered over speakers 320a and 325a.

In some embodiments, a phone-call application-specific state is supported such that only one of vehicle 340a or multifunction device 300a is in a phone call and utilizing the vehicle 340a speakers 320a and 325a and microphone 335a. In some embodiments, a turn-by-turn application-specific state is supported such that only one of only one of vehicle 340a or multifunction device 300a provides turn-by-turn navigation instructions. Support for a turn-by-turn application-specific state is provided to avoid vehicle 340a or multifunction device 300a (possibly) providing conflicting directions to the user.

Home Entertainment Systems and Home Automation

Figure 3B:
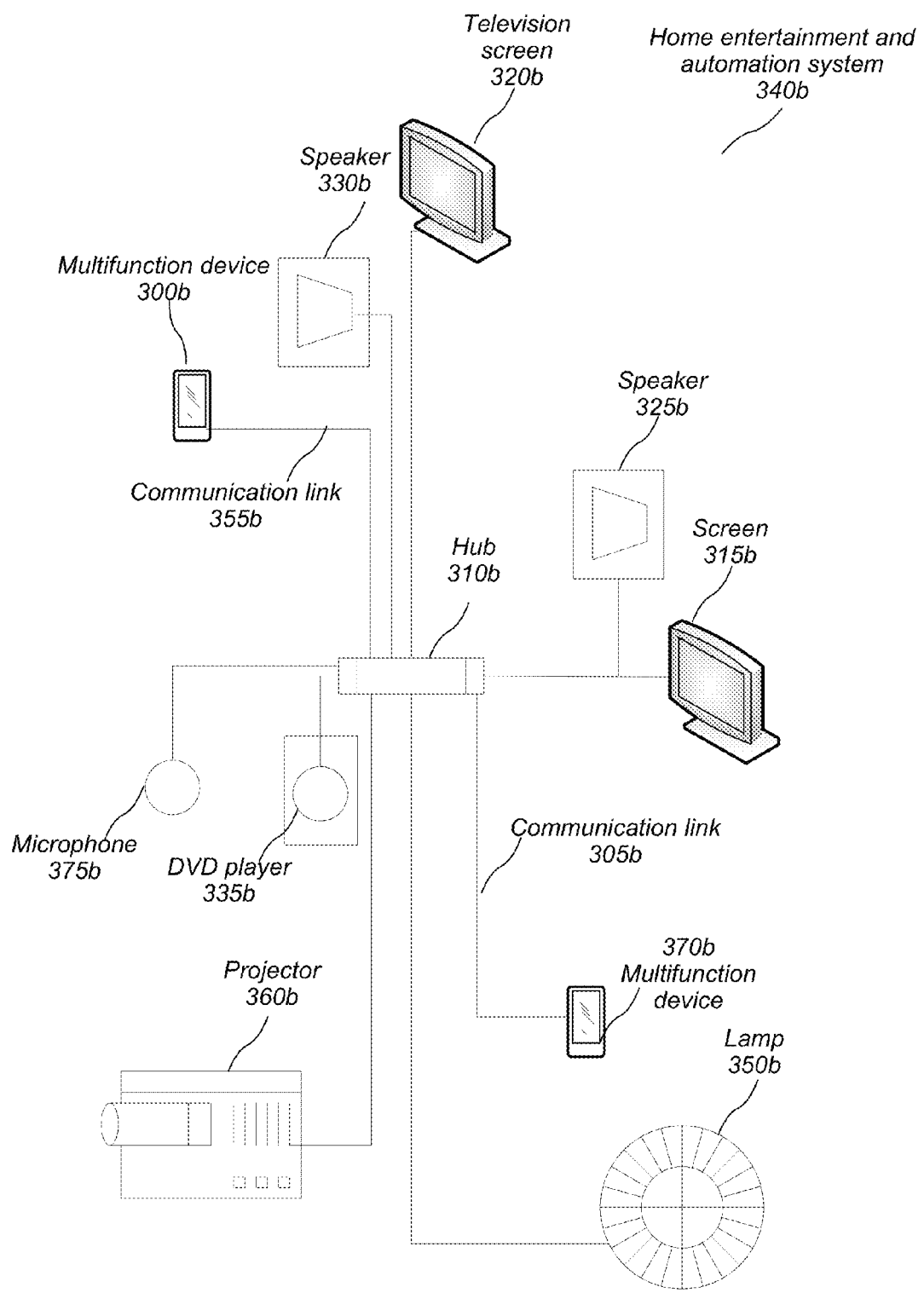
FIG. 3B illustrates a multifunction device interacting with audio and visual resources of a home entertainment and automation system in accordance with some embodiments.

FIG. 3B illustrates a multifunction device interacting with audio and visual resources of a home entertainment and automation system in accordance with some embodiments. A first multifunction device 300*b* and a second multifunction device 370*b* communicate over a respective first communication link 355*b* and second communication link 305*b* (connected e.g., via RF circuitry 108 of FIG. 1 or a wire to external port 124 of FIG. 2) with a hub 310*b* of the home entertainment and automation system 340*b*. In some embodiments, the hub 310*b* of the home entertainment and automation system 340*b* may be a general or special purpose computing device with processing and memory features similar to those discussed below with respect to FIG. 6 and may communicate with a plurality of multifunction devices to arbitrate among their requests for various resources, e.g., giving control of projector 360*b* to a process executing on multifunction device 370*b* and control of television screen 320*b* to multifunction device 300*b*. Home entertainment and automation system 340*b* is attached to display screens 315*b* and 320*b* as well as speakers 325*b* and 330*b*. A DVD player 335*b* is likewise attached to hub 310*b*.

Some embodiments provide a mechanism for the home entertainment and automation system 340*b* and multifunction devices 300*b* and 370*b* to negotiate ownership and use of shared resources and communicate application ownership state information to avoid conflict that would lead to a bad user experience. Examples of shared resources include display screens 315*b* and 320*b*. Display screen 315*b* may be, in one example, a conventional television screen, while screen 315*b* may be usually designated as a home alarm system interface panel. A microphone 375*b* may also be attached to hub 310*b*, and may be a shared resource.

Other examples of shared resources include a duplex (input and output) audio stream carried over speakers 320*b* and 325*b*, as well as microphone 375*b*. In some embodiments, it is preferable that an implementation be provided such that there can be only one source (either hub 310*b*, multifunction device 370*b*, or multifunction device 300*b*) for main audio carried over each of speakers 320*b* and 325*b*. Further, in some embodiments, an arbiter in hub 310*b* can take control of screens, microphones and speakers on multifunction device 370*b*, or multifunction device 300*b*.

Other examples of shared resources include microphone 375*b*. Voice control, personal assistant communications (e.g., Siri™ by Apple), telephony, home automation alerts and commands, home alarm system alerts and commands, and media delivery (or commands for media delivery) are examples of audio that may be delivered by main audio carried over speakers 320*b* and 325*b*, as well as microphone 375*b*. While embodiments are described with respect to an arbiter executing on a multifunction device 300*b* and multifunction device 370*b*, one of skill in the art will readily comprehend in light of having read the attached disclosure that the disclosure is not so limited, and that embodiments of the arbiters described herein may also execute on other devices, such as hub 310*b* or within cabling or other communication link 305*b* or 355*b*. In some embodiments, a shared resource is a motor or actuator or feature other than an audio or visual resource, such as lamp 350*b*.

Additionally, some embodiments support an alternate output-only audio stream carried over speakers 330*b* and 325*b*. In some embodiments, there can be multiple sources of alternate audio, which are mixed together (possibly with ducking) UI sounds, alerts, and home automation system alerts are examples of audio that would go over this stream. In some embodiments, home entertainment and automation system 340*b* and multifunction device 300*b* and multifunction device 370*b* distinguish between main and alternate audio, and route audio accordingly.

Use in Public Spaces and Conveyances

Figure 3C:
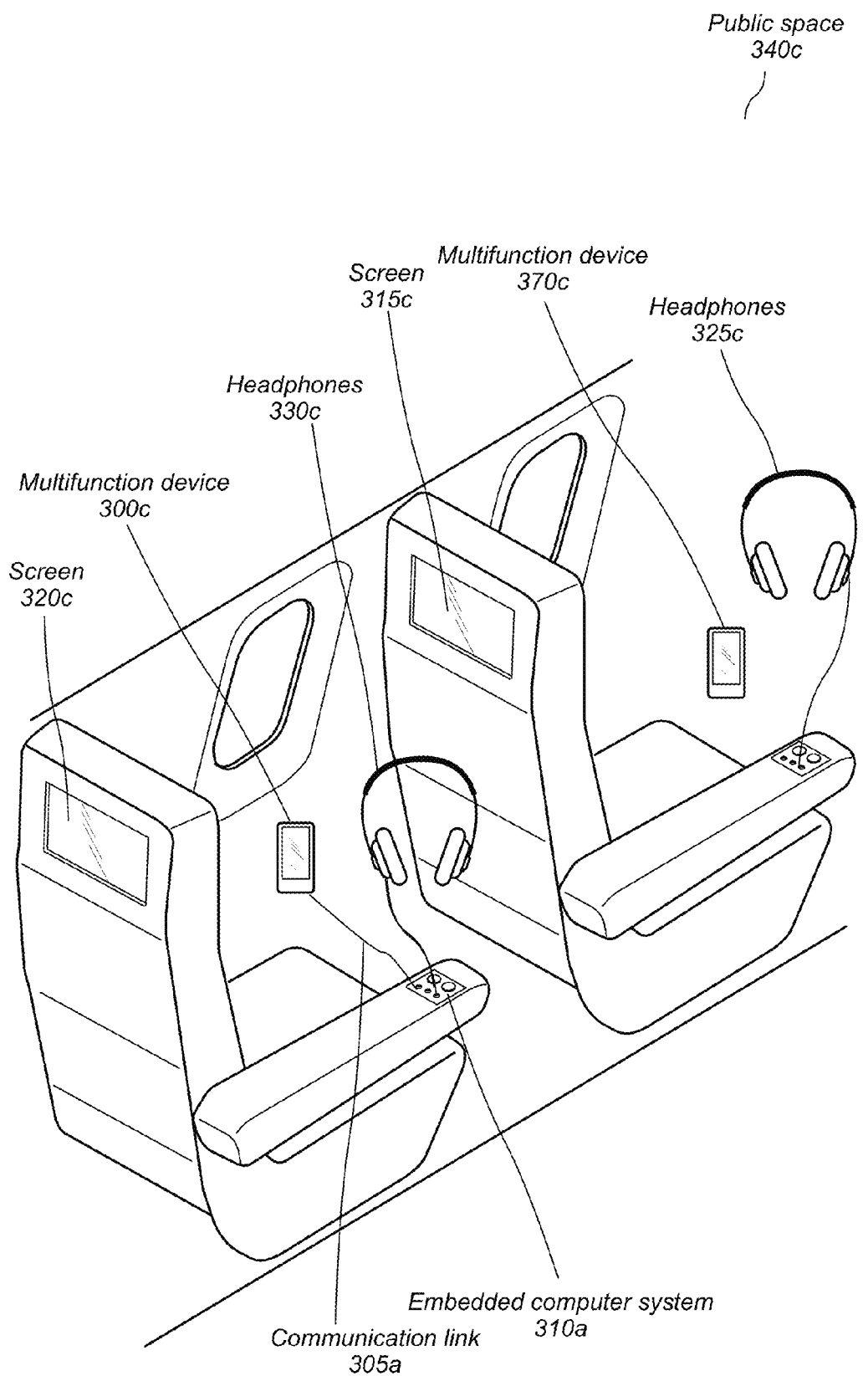
FIG. 3C illustrates a multifunction device interacting with audio and visual resources of an aircraft in accordance with some embodiments.

Some embodiments support negotiating control of shared audio or visual resources in public spaces and conveyances. Examples of such shared audio or visual resources in public spaces and conveyances include shared viewing screens in gyms (e.g., the row of televisions in front of an array of elliptical machines), gaming pods (e.g., the screen, couch and speaker combinations in college student centers) and audiovisual systems aboard trains, planes and ferries. FIG. 3C illustrates a multifunction device interacting with audio and visual resources of a public space in accordance with some embodiments.

A multifunction device 300*c* communicates over a communication link 305*c* (connected e.g., via RF circuitry 108 of FIG. 1 or a wire to external port 124 of FIG. 2) with an embedded computer system 300*c* of the public space 340*c*. The embedded system may be a general or special purpose computing device with processing and memory features similar to those discussed below with respect to FIG. 6. Embedded system is attached to display screens 315*c* and 320*c* as well as headphone sets 325*c* and 330*c*.

Some embodiments provide a mechanism for the embedded computer system 310*c* of the public space 340*c*, multifunction device 370*c* and multifunction device 300*c* to negotiate ownership and use of shared resources and communicate application ownership state information to avoid conflict that would lead to a bad user experience. Examples of shared resources include display screens 315*c* and 320*c*. Other examples of shared resources include a duplex (input and output) audio stream carried over headphones 320*c* and 325*c*, as well as a microphone attached to headphones 320*c* and 325*c*. In some embodiments, it is preferable that an implementation be provided such that there can be only one source (either embedded computer system 310*c* of the public space 340*c*, multifunction device 370*c* or multifunction device 300) for main audio carried over speakers 320 and 325, as well as microphone 335.

Video games, voice control, personal assistant communications (e.g., Siri™ by Apple), telephony, and centrally provided entertainment media are examples of audio that may be delivered by main audio carried over headphones 320*c* and 325*c*, as well. While embodiments are described with respect to an arbiter executing on a multifunction device 300, one of skill in the art will readily comprehend in light of having read the attached disclosure that the disclosure is not so limited, and that embodiments of the arbiters described herein may also execute on other devices, such as embedded computer system 310 or circuitry built into communication link 305

Additionally, some embodiments support an alternate output-only audio stream carried over headphones 320*c* and 325*c*. In some embodiments, there can be multiple sources of alternate audio, which are mixed together (possibly with ducking). As used herein, ducking is the process of reducing the volume of one piece of audio from a first source just before a second piece of audio from a second source plays, and then restoring the volume of the first piece of audio from the first source after the second piece of audio from the second source completes. UI sounds, alerts, and navigation prompts are examples of audio that would go over this stream. In some embodiments, both embedded computer system 310*c* of the public space 340*c* and multifunction device 300*c* or multifunction device 370*c* distinguish between main and alternate audio, and route audio accordingly.

Arbiter Module

Figure 4:
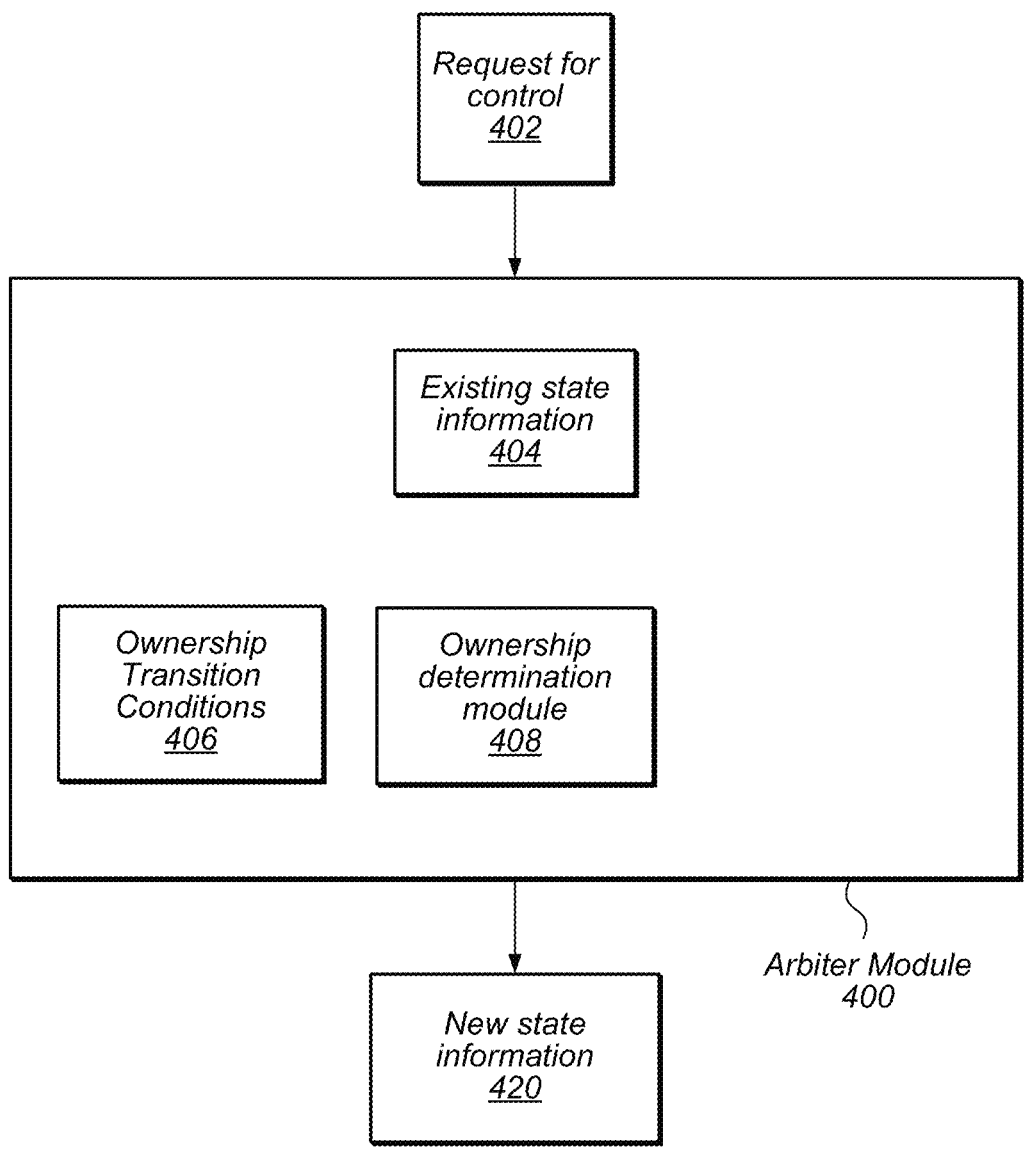
FIG. 4 illustrates an arbiter module for negotiating control of a shared audio or visual resource of an automobile, according to some embodiments.

FIG. 4 illustrates an arbiter module for negotiating control of a shared audio or visual resource of an automobile, according to some embodiments. Arbiter module 400 includes an ownership determination module 408. Arbiter module 400 receives a request for control 402. Request for control 402 is a request for control of a shared audio or visual resource of the vehicle. Arbiter module 400 maintains existing state information 404 and ownership transition conditions 406. Existing state information 404 reflects ownership of the shared audio or visual resource, and ownership transition conditions 406 reflect conditions under which the shared audio or visual resource may experience a transition in ownership. Request for control 402 is received from one of a plurality of processes including a process executing on an embedded system attached to the vehicle and a process executing on a mobile computing device temporarily communicating with the vehicle.

Ownership determination module 408 determines new state information 420 on ownership of the shared audio or visual resource. In some embodiments, determining the new state information includes determining the new state information based at least in part on request for control 402 and the ownership transition conditions 406. In some embodiments, determining the new state information includes determining the new state information based at least in part on request for control 402, existing state information 404, and the ownership transition conditions 406. New state information 420 indicates which of the processes controls output of the shared audio or visual resource of the vehicle. Ownership determination module 408 determines new ownership transition conditions of the shared audio or visual resource, and arbiter module 420 communicates to a controller interface of the shared audio or visual resource the new state information 420.

In some embodiments, existing state information 404 includes an internal representation of the current mode. In one embodiment embodiments, internal representation of the current mode in existing state information 404 consists of five properties. The first two properties indicate ownership and use of the two shared resources: screen(s) and main audio (alternate audio can be sourced from both vehicle and multifunction device simultaneously, such that there need be no single ownership of that stream).

An example of content of state information 404 (or new state information 420) and ownership transition conditions 406 (bolded) is described below, in which five properties (labeled 1-5) are each composed of a set of variables (labeled a, b, c . . . ), and bracketed information identifies options values for a particular variable, which are described below. In one embodiment, existing state information 404 for a screen includes:

1. Screen
   a. [Vehicle|Phone] owns Screen
   b. Other may take Screen [anytime|user-initiated|never]
   c. Other may borrow Screen [anytime|user-initiated|never]

Some embodiments support a concept described as borrowing, in which a process requiring access to a resource may temporarily seize control of the resource while agreeing to return control of the resource to the owner.
Optionally:
   d. [Phone|Vehicle] has borrowed Screen
   e. Other may re-take Screen [anytime|user-initiated|never]

In one embodiment, existing state information 404 (or new state information 420) and ownership transition conditions 406 (bolded) for a main audio channel include:
2. Main Audio
   [Vehicle|Phone] owns Main Audio
   g. Other may take Main Audio [anytime|user-initiated|never]
   h. Other may borrow Main Audio [anytime|user-initiated|never]
Optionally:
   i. [Phone|Vehicle] has borrowed Main Audio
   j. Other may re-take Main Audio [anytime|user-initiated|never]

In some embodiments, existing state information 404 (or new state information 420) and ownership transition conditions 406 are organized such that only one side (vehicle or multifunction device) can claim ownership of the resource at any given point in time. When one side claims ownership of a resource, it also constrains the circumstances under which ownership can be transferred. In some embodiments, these constraints are expressed as ownership transition conditions 406 with values such as:

Anytime: The other side may take/borrow the resource at any time, if desired. If the screen is showing non-important information, it would use this value.
  User-Initiated: The other side may take or borrow this resource, but doing so would disrupt the current user experience, and should only happen in response to a user initiated action, and if acquiring the resource is important to the user experience of the new mode. While music is playing, for example, the main audio channel should not be taken unless the user has switched to a different audio source.
  Never: The other side may not take or borrow this resource under any circumstances. The owner/borrower of the resource would set this during a phone call, or while a safety alert is being shown.

In some embodiments, ownership of a resource can be permanently transferred (taken) or temporarily transferred (borrowed). The concept of ownership is explained below.
3. Speech
   k. [Vehicle|Phone|Neither] is doing [speech recognition|speech]
4. [Vehicle|Phone|Neither] is on a phone call
5. [Vehicle|Phone|Neither] is providing turn by turn navigation instructions In some embodiments, the values of the application state properties are purely informative, to allow both the vehicle and multifunction device to make policy decisions to improve the user experience. As an example, in some embodiments, while one of the vehicle and multifunction device is performing speech recognition, all audio is silenced to avoid interfering with the speech recognition algorithms. As a further example, in some embodiments, while one of the vehicle and multifunction device is speaking to the user, other speech is suppressed or conveyed as tones rather than speech; multiple, simultaneous speakers can be confusing to the user. As a further example, in some embodiments, while one of the vehicle and multifunction device is on a phone call, the other of the vehicle and multifunction device cannot initiate a phone call (first one wins). In some embodiments, if a first one of the vehicle and multifunction device initiates a cell phone call, the other of the vehicle and multifunction device is blocked from initiating a cell phone call until the completion of the initial call.

As a further example, in some embodiments, while one of the vehicle and multifunction device initiates providing turn-by-turn navigation instructions, the other of the vehicle and multifunction device stops providing turn-by-turn navigation instructions, if applicable (last one wins). In some embodiments, during a turn-by-turn direction session, initiating a new turn-by-turn direction session cancels the pre-existing turn-by-turn direction session. In some embodiments, there may be, however, circumstances in which the current values of the application state properties must be ignored to convey, for example, critical safety or emergency information to the user.

In some embodiments, ownership of a resource can be permanently transferred (taken) or temporarily transferred (borrowed). In taking a resource, ownership of the resource is permanently transferred to one of the vehicle and multifunction device. For example, if the user switches from the vehicle's FM radio to the music app on the multifunction device, for example, the multifunction device would take the main audio channel from the vehicle. In borrowing a resource, ownership is temporarily transferred. When ownership is returned, the owner resumes whatever it was doing with the resource. If the user is listening to the vehicle's FM radio and starts a personal assistant session, for example, the multifunction device would borrow the main audio channel. When the personal assistant session ends, ownership returns to the vehicle and the FM radio would continue.

When a resource is borrowed by one of the vehicle and multifunction device, the other side still retains ownership, and the "take" state is maintained. In some embodiments, maintaining the original ownership state (with take constraints) supports the following three possible ways for a borrow state to end:

1.) The one of the vehicle and multifunction device borrowing the resource is done with it and returns it to the owner. In some embodiments, this is the typical case. For example, when a phone call ends, the main audio channel might return to the vehicle to continue FM radio.

2.) The owner requires the resource and prematurely ends the borrow, subject to the retake constraint of the borrow state. For example, the multifunction device may borrow the main audio channel to start a personal assistant session, but the vehicle prematurely ends the session because the main audio channel is needed for an incoming call from another phone.

3.) The one of the vehicle and multifunction device borrowing the resource wishes to convert the "borrow" to a "take", subject to the original owner's take constraints. For example, the user may ask the personal assistant to switch from FM radio to the music player of the multifunction device. The personal assistant session initially borrows the main audio channel, but the music player subsequently takes it.

In some embodiments, existing state information 404 and ownership transition conditions 406 contain all of the attributes described above as an internal representation for use by arbiter module 400, while new state information 420 communicated to a vehicle reflects a simplified internal state as described below:
1. [Vehicle|Phone] has Screen
2. [Vehicle|Phone] has Main Audio
3. [Vehicle|Phone|Neither] is doing [speech recognition-|speech]
4. [Vehicle|Phone|Neither] is on a phone call
5. [Vehicle|Phone|Neither] is providing turn-by-turn navigation instructions The simplification is in the communication of resource ownership. In such embodiments, the current mode, from the vehicle's perspective, only indicates the current user of the resource (whether it was borrowed or taken is irrelevant). If ownership of a resource is returned to the vehicle that it didn't explicitly ask for, the vehicle resumes whatever it was last doing with the resource (where possible).

In some embodiments, mode changes can originate from both the vehicle and the multifunction device as request for control 402. If the vehicle initiates a mode change by sending request for control 402, the updated mode will be sent to the multifunction device as new state information 420. In some embodiments, the vehicle is required to honor any mode changes from the multifunction device within a pre-defined amount of time (for example, relinquish control of the screen within 100 ms if ownership was transferred to the multifunction device). To modify the current mode, the vehicle sends the multifunction device a mode change request as request for control 402, communicating the intent of the mode change. Arbiter module 400, for example, executing on the multifunction device, though in some embodiments, arbiter module 400 may execute on an embedded processor of a vehicle, receives request for control 402 and determines a new mode (including corresponding ownership transition conditions 406 and new state information 420) based on the request.

In some embodiments, badly formed requests will be rejected, and an error returned to whichever of the vehicle or multifunction device that sent the request. Once the new mode (including corresponding ownership transition conditions 406 and new state information 420) has been determined, the new mode will be communicated to the vehicle (e.g., to a controller of a resource executing on embedded computer system 310), at which point the controller of a resource executing on embedded computer system 310 inspects the new current mode embodied as new state information 420 and determines whether it received the resources it asked for and react accordingly.

In some embodiments, a mode change request (e.g., request for control 402) consists of the following information:

1. Screen:
Transfer Type: Take, Untake, Borrow, Unborrow
Priority: Nice to Have, or User-Initiated
Constraints: For Take and Borrow, the "Other may take/borrow" or "Other may retake" constraints.
2. Main Audio:
Transfer Type: Take, Untake, Borrow, Unborrow
Priority: Nice to Have, or User-Initiated
Constraints: For Take and Borrow, the "Other may take/borrow" or "Other may retake" constraints.
3. Speech: Speaking, Speech Recognizing, or Neither
4. Phone Call: True or False
5. Turn by Turn: True or False In some embodiments, a change request (e.g., request for control 402) must include at least one of Fields 1 through 5. If an action requires changes to multiple properties of a mode, all are sent in a single transaction (e.g., request for control 402). But not all mode change requests will require changes to all fields, in which case they can be left out. In some embodiments, the vehicle always updates the multifunction device with its current state, regardless of the current mode. For example, if the user switches from FM radio to the CD player, ownership of the main audio will not change. But the vehicle, nonetheless, sends a mode change request (e.g., request for control 402) to arbiter module 400 indicating that it wants to "take" main audio. The vehicle specifies (in request for control 402) whether it wishes to "take" or "borrow" a resource, as described above. When the vehicle is finished with borrowing a resource, it sends an "unborrow" mode change request. The "untake" transfer type is used to indicate to the multifunction device that the vehicle no longer requires use of the resource, and constraints are reset to "Other may take anytime". A successful "take" or "borrow" of a resource currently borrowed by the other side will terminate the borrow, above. In some embodiments, a priority is used to indicate to arbiter module 400 how important a transfer is to the requesting device. A priority of "nice to have" will succeed if the take/borrow constraint is "anytime". Similarly, a priority of "user-initiated" will succeed if the take/borrow constraint is "user-Initiated" or "anytime".

The following examples illustrate a sequence of modes and mode changes.

Vehicle Showing Vehicle Info—In this initial state, the vehicle is showing non-critical information such as MPG and mileage. No audio is playing.
1. Vehicle owns Screen
Other may take Screen anytime
Other may borrow Screen anytime
2. Vehicle owns Main Audio
Other may take Main Audio anytime
Other may borrow Main Audio anytime
3. Neither is doing speech recognition or speech
4. Neither is on a phone call
5. Neither is providing turn-by-turn navigation instructions User turns on FM radio—The user now turns on the vehicle's FM radio. The vehicle sends the following mode change request in request for control 402:
1. Screen:
Transfer Type: Take
Priority: Nice to Have
Constraints: Other may take anytime; other may borrow anytime
2. Main Audio:
Transfer Type: Take
Priority: User-Initiated
Constraints: Other may take user-initiated; other may borrow anytime Arbiter module 400 evaluates this request and determines new state information 420 to adjust the current mode to:
1. Vehicle owns Screen
Other may take Screen anytime
Other may borrow Screen anytime
2. Vehicle owns Main Audio
Other may take Main Audio user-initiated
Other may borrow Main Audio anytime
3. Neither is doing speech recognition or speech
4. Neither is on a phone call
5. Neither is providing turn-by-turn navigation instructions The updated mode sent to the vehicle as new state information 420 is:
1. Vehicle has Screen
2. Vehicle has Main Audio
3. Neither is doing speech recognition or speech
4. Neither is on a phone call
5. Neither is providing turn-by-turn navigation instructions Case 1: User switches to music played by the multifunction device—The user now presses the button to source audio from the multifunction device instead of the vehicle's FM radio. The multifunction device claims ownership of the screen and main audio and the new state is:
1. Phone owns Screen
Other may take Screen anytime
Other may borrow Screen anytime
2. Phone owns Main Audio
Other may take Main Audio user-initiated
Other may borrow Main Audio anytime
3. Neither is doing speech recognition or speech
4. Neither is on a phone call
5. Neither is providing turn-by-turn navigation instructions The updated mode sent to the vehicle as new state information 420 is:
1. Phone has Screen
2. Phone has Main Audio
3. Neither is doing speech recognition or speech
4. Neither is on a phone call
5. Neither is providing turn-by-turn navigation instructions Case 2: User answers an incoming phone call—In this alternate scenario, the user is listening to the vehicle's FM radio when a phone call comes in. The phone will first borrow the screen and main audio to play the ring tone and show caller ID.
1. Vehicle owns Screen
Other may take Screen anytime
Other may borrow Screen anytime
Phone has borrowed Screen
Other may re-take Screen anytime
2. Vehicle owns Main Audio
Other may take Main Audio user-initiated
Other may borrow Main Audio anytime
Phone has borrowed Main Audio
Other may re-take Main Audio never
3. Neither is doing speech recognition or speech
4. Neither is on a phone call
5. Neither is providing turn-by-turn navigation instructions The mode change communicated to the vehicle will be:
1. Phone has Screen
2. Phone has Main Audio
3. Neither is doing speech recognition or speech
4. Neither is on a phone call
5. Neither is providing turn-by-turn navigation instructions Assuming the user chooses to answer the call, the mode transitions to a "in a phone call" mode.
1. Vehicle owns Screen
Other may take Screen anytime
Other may borrow Screen anytime
Phone has borrowed Screen
Other may re-take Screen anytime
2. Vehicle owns Main Audio
Other may take Main Audio user-initiated
Other may borrow Main Audio anytime
Phone has borrowed Main Audio
Other may re-take Main Audio never
3. Phone is doing speech
4. Phone is on a phone call
5. Neither is providing turn-by-turn navigation instructions The mode change communicated to the vehicle will be as new state information 420:
1. Phone has Screen
2. Phone has Main Audio
3. Phone is doing speech
4. Phone is on a phone call
5. Neither is providing turn-by-turn navigation instructions When the phone call ends, the phone returns the screen and main audio to the vehicle:
1. Vehicle owns Screen
Other may take Screen anytime
Other may borrow Screen anytime
2. Vehicle owns Main Audio
Other may take Main Audio user-initiated
Other may borrow Main Audio anytime
3. Neither is doing speech recognition or speech
4. Neither is on a phone call
5. Neither is providing turn-by-turn navigation instructions The mode change communicated to the vehicle as new state information 420 will be:
1. Vehicle has Screen
2. Vehicle has Main Audio
3. Neither is doing speech recognition or speech
4. Neither is on a phone call
5. Neither is providing turn-by-turn navigation instructions The vehicle sees that it has resumed ownership of the screen and main audio, and resumes the FM radio in response.

Example Operations

Figure 5A:
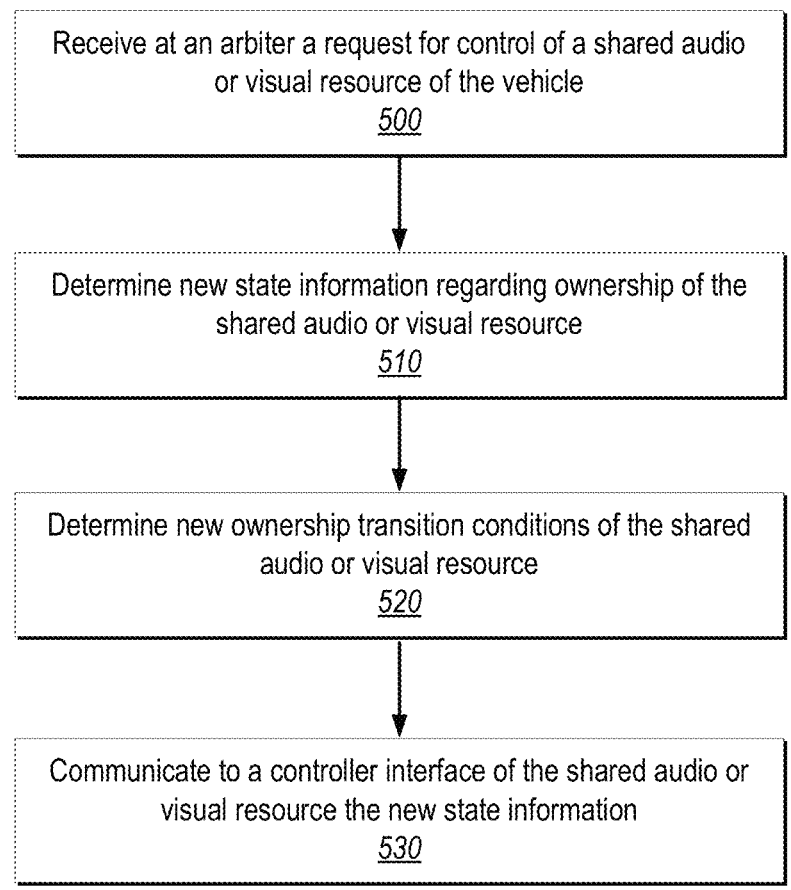
FIG. 5A is a flow diagram illustrating one embodiment of a method for negotiating control of a shared audio or visual resource of an automobile.

FIG. 5A is a flow diagram illustrating one embodiment of a method for negotiating control of a shared audio or visual resource of an automobile. A request for control of a shared audio or visual resource of the vehicle is received at an arbiter (block 500). New state information regarding ownership of the shared audio or visual resource is determined (block 510). New ownership transition conditions of the shared audio or visual resource are determined (block 520). The new state information is communicated to a controller interface of the shared audio or visual resource (block 530). While examples are discussed herein with respect to automobiles, one of skill in the art will readily appreciate in view of having read the present disclosure that examples referencing vehicles are no so limited, and that embodiments may apply to a wide range of machines providing audio or visual resources, such as home appliances, non-wheeled vehicles, or other devices.

FIG. 5B is a flow diagram illustrating one embodiment of a method for negotiating control of a shared audio or visual resource of an automobile. A request for control of a shared audio or visual resource of the vehicle is received at an arbiter. The arbiter maintains existing state information for ownership of the shared audio or visual resource and ownership transition conditions of the shared audio or visual resource. The request is received from a process executing on an embedded system attached to the vehicle or a process executing on a mobile computing device temporarily communicating with the vehicle (block 505). New state information regarding ownership of the shared audio or visual resource is determined, based at least in part on the request for control and the ownership and transition conditions such that the new state information indicates which of the processes controls the output of the shared audiovisual resource (block 515). New ownership transition conditions of the shared audio or visual resource are determined (block 525). The new state information is communicated to a controller interface of the shared audio or visual resource (block 535).

Figure 5C:
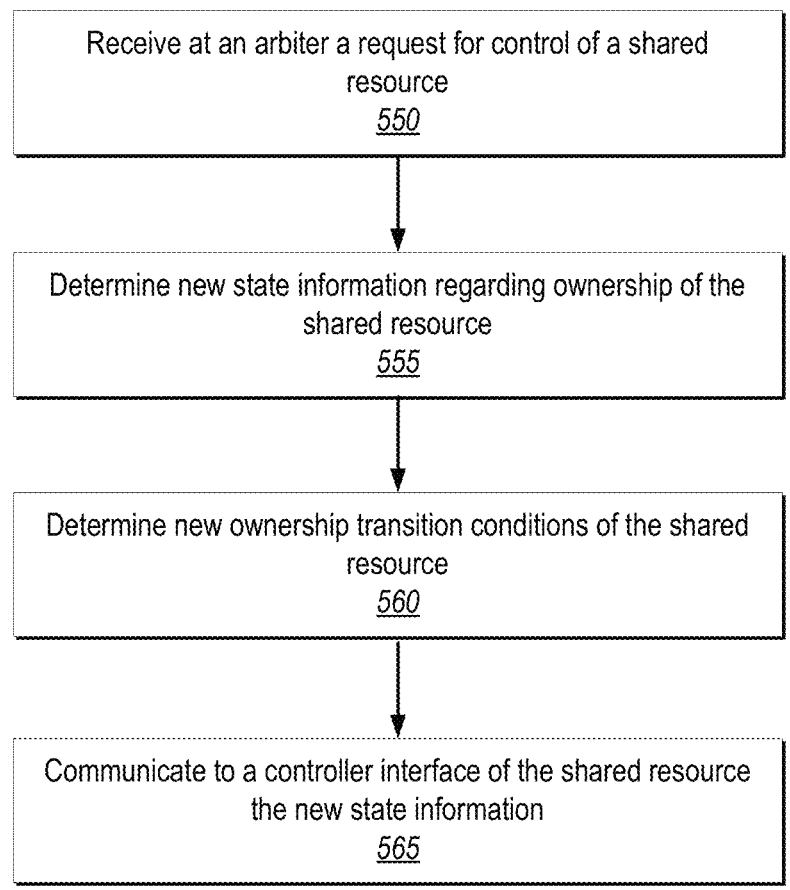
FIG. 5C is a flow diagram illustrating one embodiment of a method for negotiating control of a shared resource.

FIG. 5C is a flow diagram illustrating one embodiment of a method for negotiating control of a shared resource. A request for control of a shared resource is received at an arbiter (block 550). New state information regarding ownership of the shared resource is determined (block 555). New ownership transition conditions of the shared resource are determined (block 560). The new state information is communicated to a controller of the shared resource. (block 565).

Example Computer System

Figure 6:
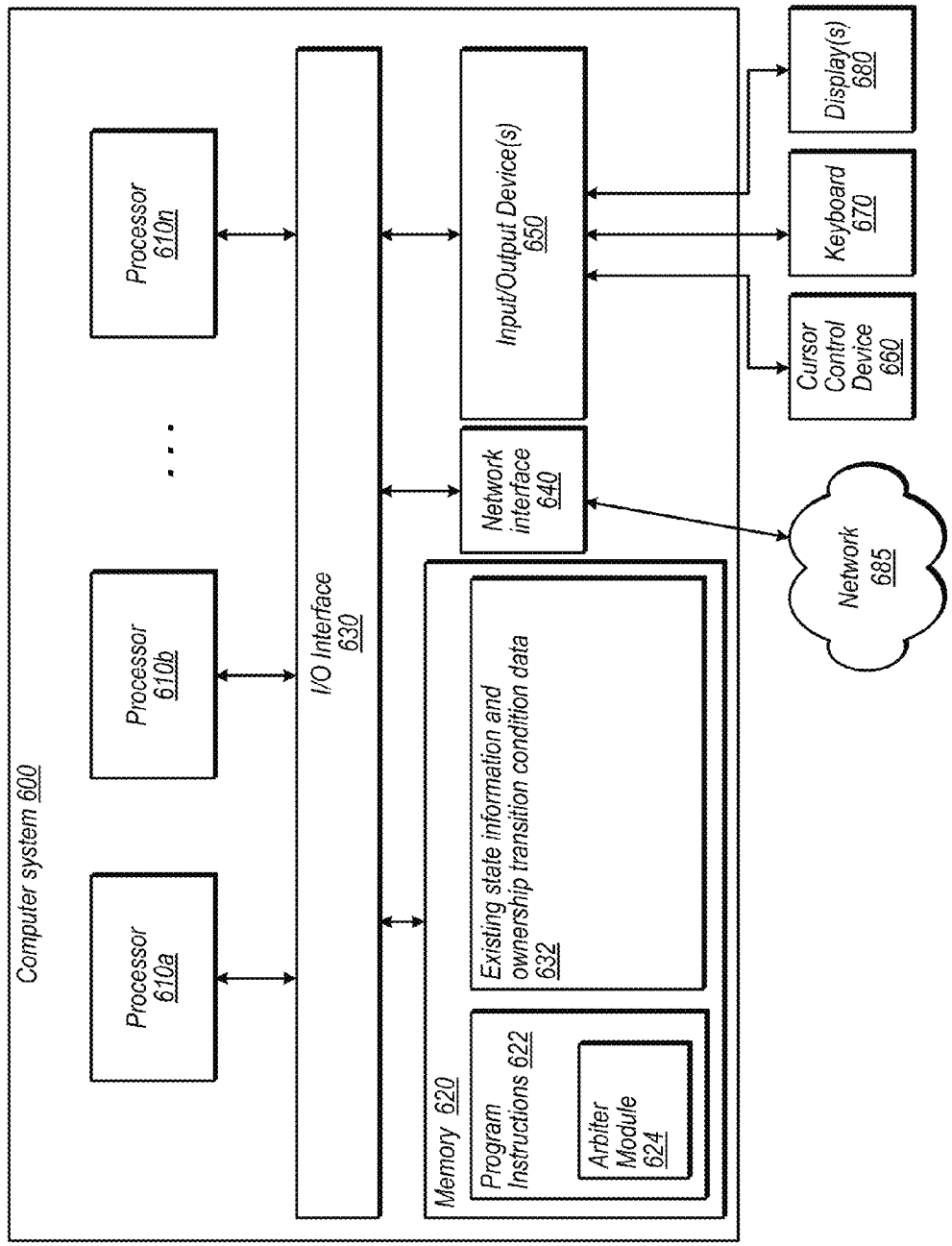
FIG. 6 illustrates an example computer system configured to implement aspects of the system and method for negotiating control of a shared resource.

FIG. 6 illustrates computer system 600 that is configured to execute any or all of the embodiments described above. In different embodiments, computer system 600 may be any of various types of devices, including, but not limited to, a computer embedded in a vehicle, a computer embedded in an appliance, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for negotiating control of a shared audio or visual resource, as described herein, may be executed on one or more computer systems 600, which may interact with various other devices. Note that any component, action, or functionality described above with respect to FIGS. 1-5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or existing state information and ownership transition condition data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions 622 may be configured to implement a mapping application 624 incorporating any of the functionality described above. Additionally, existing state information and ownership transition condition data 632 of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 622, which may be processor-executable to implement any element or action described above. In one embodiment, the program instructions may implement the methods described above, such as the methods illustrated by FIG. 8. In other embodiments, different elements and data may be included. Note that data 632 may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A method for negotiating control of a shared audio or visual resource of an automobile, the method comprising:
receiving at an arbiter a request for control of a shared audio or visual resource of a vehicle, wherein
the arbiter maintains
existing state information for ownership of the shared audio or visual resource and
ownership transition conditions of the shared audio or visual resource, and
the request for control of the shared audio or visual resource of the vehicle is received from one of a plurality of processes comprising
a process executing on an embedded system of the vehicle and
a process executing on a mobile computing device temporarily communicating with the vehicle, wherein
the ownership transition conditions are configured such that only one of the plurality of processes can claim ownership of the shared audio or visual resource at any given point in time;
determining new state information regarding ownership of the shared audio or visual resource, wherein
the determining the new state information comprises determining the new state information based at least in part on
the request for control and
the ownership transition conditions, and
the new state information indicates which of the processes controls output of the shared audio or visual resource of the vehicle; and
communicating to a controller interface of the shared audio or visual resource the new state information.

2. The method of claim 1, wherein
the determining new state information regarding ownership of the shared audio or visual resource further comprises
determining new state information regarding ownership of the shared audio or visual resource without regard to whether the request for control of the shared audio or visual resource of the vehicle originated from the process executing on an embedded system attached to the vehicle or a process executing on a mobile computing device temporarily communicating with the vehicle.

3. The method of claim 1, wherein the arbiter is a process executing on the vehicle.

4. The method of claim 1, further comprising
receiving at the arbiter a request for control of another shared audio or visual resource of the vehicle; and
determining new state information regarding ownership of the another shared audio or visual resource of the vehicle based on the request for control of the another of the shared audio or visual resource of the vehicle, wherein
the new state information regarding ownership of the another shared audio or visual resource of the vehicle indicates which of the processes controls output of the another shared audio or visual resource of the vehicle, and
the new state information regarding ownership of the another shared audio or visual resource of the vehicle is determined independent of the new state information regarding ownership of the shared audio or visual resource.

5. The method of claim 4, wherein
the one of the shared audio or visual resource of the vehicle is a video display, and
the another of the shared audio or visual resource of the vehicle is an audio channel.

6. The method of claim 4, wherein
the one of the shared audio or visual resource of the vehicle is an output channel, and
the another of the shared audio or visual resource of the vehicle is an input/output channel.

7. The method of claim 1, wherein
the determining new state information regarding ownership of the shared audio or visual resource further comprises determining new state information regarding ownership of the shared audio or visual resource such that
a first one of the processes owns control of the one of the shared audio or visual resource of the vehicle, and
a second one of the processes is designated to control output of the one of the shared audio or visual resource for the duration of a task and returns control of the one of the shared audio or visual resource of the vehicle to control output of the one of the shared audio or visual resource after completion of the task.

8. The method of claim 1, further comprising,
configuring a control channel for communicating between the shared audio or visual resource, the arbiter, and the mobile computing device, wherein the arbiter is a process executing on the embedded system attached to the vehicle.

9. A multifunction device, comprising:
one or more processors; and
one or more memories storing an arbiter that is executable on the one or more processors to perform:
receiving at the arbiter a request from one of a plurality of processes for control of a shared audio or visual resource of the vehicle, wherein the arbiter maintains
existing state information for ownership of the shared audio or visual resource and
ownership transition conditions of the shared audio or visual resource, wherein the ownership transition conditions are configured such that only one of the plurality of processes can claim ownership of the shared audio or visual resource at any given point in time;
determining new state information regarding ownership of the shared audio or visual resource, wherein
the determining the new state information comprises determining the new state information based at least in part on the request for control and the ownership transition conditions,
the new state information indicates which of the processes controls output of the shared audio or visual resource of the vehicle;
determining new ownership transition conditions of the shared audio or visual resource; and
communicating to a controller interface of the shared audio or visual resource the new state information.

10. The multifunction device of claim 9, wherein
the determining new state information regarding ownership of the shared audio or visual resource further comprises
determining new state information regarding ownership of the shared audio or visual resource without regard to whether the request for control of the shared audio or visual resource of the vehicle originated from the process executing on an embedded system attached to the vehicle or a process executing on a mobile computing device temporarily communicating with the vehicle.

11. The multifunction device of claim 9, wherein the plurality of processes comprises:
a process executing on an embedded system attached to the vehicle and
a process executing on the multifunction device.

12. The multifunction device of claim 9, further comprising
receiving at the arbiter a request for control of another shared audio or visual resource of the vehicle; and
determining new state information regarding ownership of the another shared audio or visual resource of the vehicle based on the request for control of the another of the shared audio or visual resource of the vehicle, wherein
the new state information regarding ownership of the another shared audio or visual resource of the vehicle indicates which of the processes controls output of the another shared audio or visual resource of the vehicle, and
the new state information regarding ownership of the another shared audio or visual resource of the vehicle is determined independent of the new state information regarding ownership of the shared audio or visual resource.

13. The method of claim 12, wherein
the one of the shared audio or visual resource of the vehicle is a video display, and
the another of the shared audio or visual resource of the vehicle is an audio channel.

14. The multifunction device of claim 12, wherein
the one of the shared audio or visual resource of the vehicle is an output channel, and
the another of the shared audio or visual resource of the vehicle is an input/output channel.

15. The multifunction device of claim 9, wherein
the determining new state information regarding ownership of the shared audio or visual resource further comprises determining new state information regarding ownership of the shared audio or visual resource such that
a first one of the processes owns control of the one of the shared audio or visual resource of the vehicle, and
a second one of the processes is designated to control output of the one of the shared audio or visual resource for the duration of a task and returns control of the one of the shared audio or visual resource of the vehicle to control output of the one of the shared audio or visual resource after completion of the task.

16. A non-transitory, computer-readable storage medium, storing program instructions executable on a computer to implement:
receiving at an arbiter a request from one of a plurality of processes for control of a shared audio or visual resource of the vehicle, wherein
the arbiter maintains
existing state information for ownership of the shared audio or visual resource and
ownership transition conditions of the shared audio or visual resource, wherein the ownership transition conditions are configured such that only one of the plurality of processes can claim ownership of the shared audio or visual resource at any given point in time, and
the plurality of processes comprises:
a process executing on an embedded system attached to the vehicle and
a process executing on a mobile computing device temporarily communicating with the vehicle;
determining new state information regarding ownership of the shared audio or visual resource, wherein
the program instructions executable on the computer to implement determining the new state information comprise program instructions executable on the computer to implement determining the new state information based at least in part on
the request for control and
the ownership transition conditions,
the new state information indicates which of the processes controls output of the shared audio or visual resource of the vehicle;
determining new ownership transition conditions of the shared audio or visual resource; and
communicating to a controller interface of the shared audio or visual resource the new state information.

17. The non-transitory, computer-readable storage medium of claim 16, wherein
the program instructions executable on the computer to implement the determining new state information regarding ownership of the shared audio or visual resource further comprise program instructions executable on the computer to implement
determining new state information regarding ownership of the shared audio or visual resource without regard to whether the request for control of the shared audio or visual resource of the vehicle originated from the process executing on an embedded system attached to the vehicle or a process executing on a mobile computing device temporarily communicating with the vehicle.

18. The non-transitory, computer-readable storage medium of claim 16, wherein the arbiter is a process executing on the mobile computing device.

19. The non-transitory, computer-readable storage medium of claim 16, further comprising program instructions executable on the computer to implement
receiving at the arbiter a request for control of another shared audio or visual resource of the vehicle; and
determining new state information regarding ownership of the another shared audio or visual resource of the vehicle based on the request for control of the another of the shared audio or visual resource of the vehicle, wherein
the new state information regarding ownership of the another shared audio or visual resource of the vehicle indicates which of the processes controls output of the another shared audio or visual resource of the vehicle, and
the new state information regarding ownership of the another shared audio or visual resource of the vehicle is determined independent of the new state information regarding ownership of the shared audio or visual resource.

20. The non-transitory, computer-readable storage medium of claim 16, wherein
the one of the shared audio or visual resource of the vehicle is a video display, and
the another of the shared audio or visual resource of the vehicle is an audio channel.

21. A method for negotiating control of a shared resource, the method comprising:

receiving at an arbiter a request from one of a plurality of processes for control of a shared resource, wherein the arbiter maintains
- existing state information for ownership of the shared resource and
- ownership transition conditions of the shared resource, wherein the ownership transition conditions are configured such that only one of the plurality of processes can claim ownership of the shared resource at any given point in time, and the plurality of processes comprises:
- a process executing on an embedded system attached to the shared resource and
- a process executing on a device temporarily communicating with the embedded system;

determining new state information regarding ownership of the shared resource, wherein
- the determining the new state information comprises determining the new state information based at least in part on the request for control and the ownership transition conditions,
- the new state information indicates which of the processes controls output of the shared resource.

22. The method of claim 21, wherein
the determining new state information regarding ownership of the shared resource further comprises
determining new state information regarding ownership of the shared resource without regard to whether the request for control of the shared resource of the vehicle originated from the process executing on an embedded system or a process executing on a mobile computing device.

23. The method of claim 21, wherein the arbiter is a process executing on the mobile computing device.

24. The method of claim 21, wherein the shared resource is an audio or visual resource of a vehicle.

25. The method of claim 21, wherein the shared resource is an audio or visual resource of a home entertainment system.

26. The method of claim 21, wherein the shared resource is an audio or visual resource of a home automation control system.

* * * * *